United States Patent [19]

Lombardi

[11] Patent Number: 4,538,574
[45] Date of Patent: Sep. 3, 1985

[54] SUPERCHARGED INTERNAL COMBUSTION ENGINE WITH A CYLINDER HEAD HAVING FOUR VALVES PER CYLINDER

[75] Inventor: Claudio Lombardi, Turin, Italy

[73] Assignee: Fiat Auto S.p.A., Italy

[21] Appl. No.: 591,604

[22] Filed: Mar. 20, 1984

[30] Foreign Application Priority Data

Mar. 25, 1983 [IT] Italy ............... 67331 A/83

[51] Int. Cl.³ ............................................. F02B 13/00
[52] U.S. Cl. ................................ 123/432; 123/562; 60/605
[58] Field of Search ............... 123/432, 308, 562, 559; 60/605

[56] References Cited

U.S. PATENT DOCUMENTS

| | | | |
|---|---|---|---|
| 2,238,889 | 4/1941 | Kollmann | 123/562 |
| 4,248,198 | 2/1981 | Deutschmann et al. | 123/559 |
| 4,445,336 | 5/1984 | Inoue | 123/559 |

FOREIGN PATENT DOCUMENTS 121171  4/1948  Australia ..................... 123/308

Primary Examiner—E. Rollins Cross
Attorney, Agent, or Firm—Andrus, Sceales, Starke & Sawall

[57] ABSTRACT

The present invention relates to a supercharged internal combustion engine having two or more cylinders, with a cylinder head having four valves per cylinder and provided with at least two turbo-compressor units, in which, with each combustion chamber separated by an imaginary line along the longitudinal axis of the cylinder head, an exhaust valve and an induction valve provided with the associated ducts connected to the first of the two turbo-compressor units are located on a first side of the imaginary line, while the other two valves lie in the half of the combustion chamber on the other side of the imaginary line and are connected to the second of the two turbo-compressor units.

8 Claims, 5 Drawing Figures 4,538,574

SUPERCHARGED INTERNAL COMBUSTION ENGINE WITH A CYLINDER HEAD HAVING FOUR VALVES PER CYLINDER

BACKGROUND OF THE INVENTION

The present invention relates to an internal combustion engine of two or more cylinders, supercharged by means of turbo-compressor units and provided with a cylinder head having four valves per cylinder, in which each half of the combustion chamber, separated by an imaginary line along the longitudinal axis of the engine, contains an exhaust valve and an induction valve. The cylinder heads of engines having four valves per cylinder, with the so-called "roof shape" combustion chambers normally have an arrangement which provides, in each half of the combustion chamber, two exhaust valves for one half chamber and two induction valves in the other half chamber.

Because of this the engine has all the induction manifolds on one side and all the exhaust manifolds on the other.

An arrangement of this type permits a rational installation of only one turbo-compressor unit, whilst the current tendency, above all in racing engines, is to utilise at least two turbo-compressor units for the purpose of reducing the "response time" and the loss of power at low engine speeds to the minimum.

In fact it is not easy to house two turbo-compressor units on the same side of the engine since the ducts which convey compressed air from the compressors to the induction manifolds become long and bulky and moreover create significant problems of space and of heat dissipation on the side of the engine where the two turbines are located.

SUMMARY OF THE INVENTION

The object of the present invention is that of providing a supercharged internal combustion engine which permits the installation of at least two turbo-compressor units without by this creating the above explained problems.

The said object is achieved by means of an internal combustion engine having two or more in-line cylinders, supercharged by means of at least two turbo-compressor units, provided with a cylinder head having four valves per cylinder, characterised by the fact that, with each combustion chamber separated by an imaginary line along the longitudinal axis of the cylinder head, a first half combustion chamber of each cylinder is provided with an exhaust valve and an induction valve having associated ducts connected to the first of the two turbo-compressor units, whilst the other two induction and exhaust valves situated in the other half of the chamber and provided with associated ducts, are connected to the second of the two turbo-compressor units; said valves being disposed in such a way that an induction valve and an exhaust valve are met around the circumference of the combustion chamber.

BRIEF DESCRIPTION OF THE DRAWINGS

This and other objects will become clear from the following description with reference to the attached drawings, provided by way of non limitative example, in which.

DETAILED DESCRIPTION OF THE INVENTION

Figure 1:
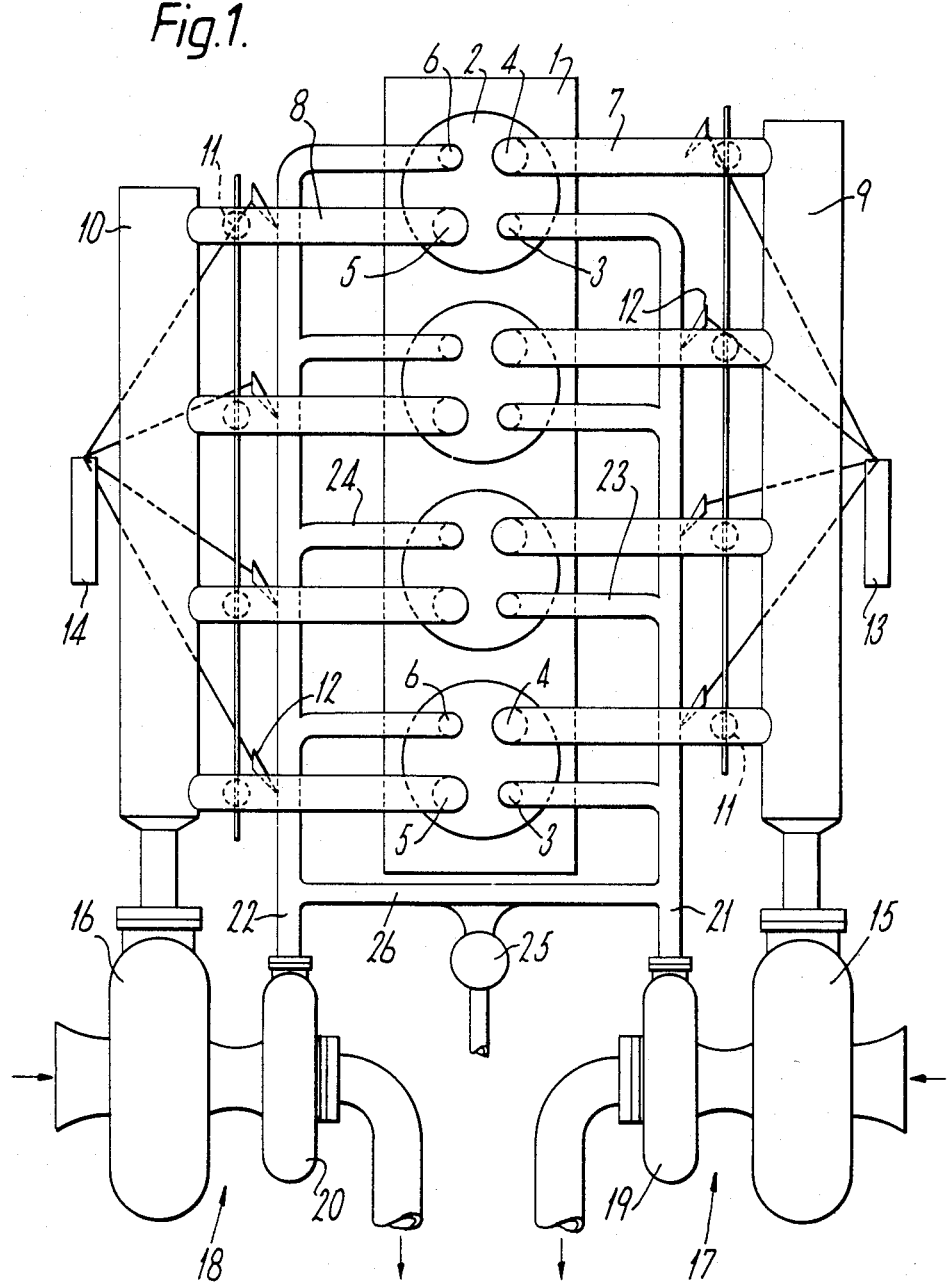
FIG. 1 is a schematic diagram illustrating an engine according to the invention.

With reference to the drawings, the reference numeral 1 indicates the cylinder head of an internal combustion engine having four in-line cylinders the combustion chambers of which are indicated with the reference numeral 2 and are each provided with four valves.

The valves are arranged in such a way that in the right hand half chamber, defined by the longitudinal axis of the cylinder head, there are disposed a first exhaust valve 3 and a first induction valve 4, and in the left hand half chamber there are disposed a second induction valve 5 and a second exhaust valve 6.

The valves are arranged in such a way that in progressing around the circumference of the combustion chamber, an induction valve and an exhaust valve are met alternately.

The induction valves are connected by means of induction ducts 7 and 8 to two induction manifolds 9 and 10 disposed on the two sides of the cylinder head. Induction is controlled by butterfly valves 11 disposed upstream of fuel injectors 12 connected to injection pumps 13 and 14. The two induction manifolds 9 and 10 are connected to two compressors 15 and 16 forming part of two turbo-compressor units 17 and 18 driven by two exhaust gas turbines 19 and 20 fed with exhaust gas via manifolds 21 and 22 and ducts 23 and 24 connected to exhaust valves 3 and 6.

A supercharging valve 25 ensures, via a duct 26, that the pressure in the exhaust manifolds 21 and 22 (or alternatively in the induction manifolds 9 and 10) does not exceed a predetermined value.

From the arrangement described above it is clear that in an engine having in-line cylinders the two turbo-compressor units can be easily positioned rationally to occupy the space on either side of the engine, making the manifolds of simple and linear form which permits a better use of the supply and exhaust flow.

Figure 2:
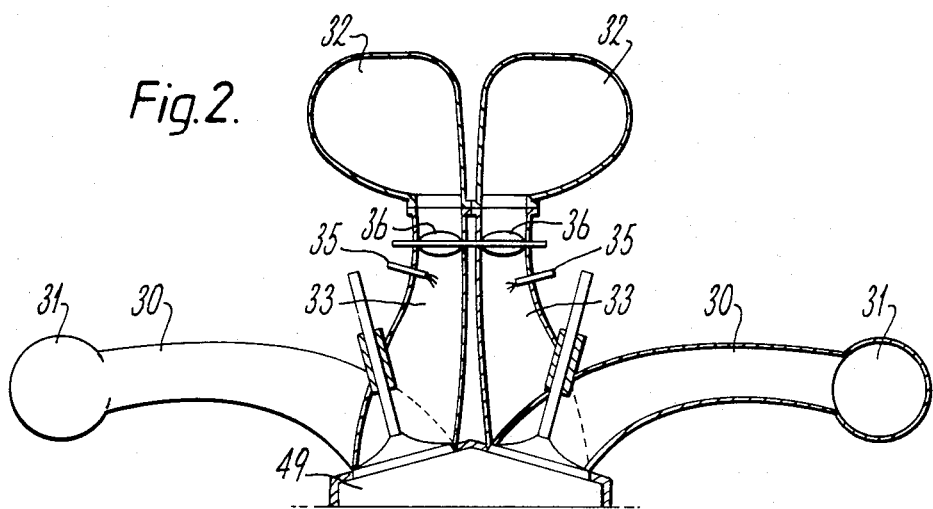
FIG. 2 is a schematic view of a detail of an engine according to the invention.
Figure 3:
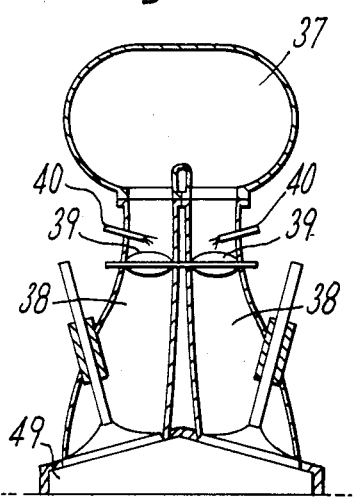
FIG. 3 is a schematic view of a second form of the detail of FIG. 2.
Figure 4:
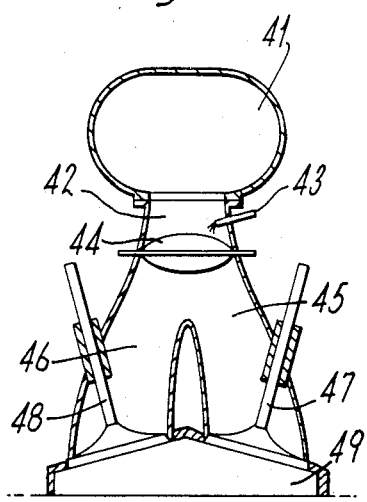
FIG. 4 is a schematic view of a third form of the detail of FIG. 2.

FIGS. 2 to 4 represent a series of possibilities of embodiments for the combination of induction and exhaust ducts. In FIG. 2, the reference numeral 30 indicates two exhaust ducts which open into two manifolds 31, connected, as in FIG. 1, to two turbo-compressor units.

The reference numerals 32, on the other hand, indicate two induction manifolds which are joined to induction ducts 33 in which the injectors 35 and the butterfly valves 36 are located.

In FIG. 3, whilst the exhaust ducts remain the same as described in FIG. 2 and are therefore not indicated, the induction manifold 37 is common to both the induction ducts 38 provided with butterfly valves 39 and injectors 40, and is connected to both compressors of the two turbo-compressor units.

In FIG. 4 there is shown a preferred embodiment of the invention, in which the induction manifold 41 is a common manifold and is connected, as in the preceding embodiment, to both the compressors of the two turbo-compressor units, whilst the induction duct 42 is a common duct for the first part of its length where the injectors 43 and butterfly valves 44 are positioned, and then splits into two ducts 45 and 46 connected to the induction valves 47 and 48.

The two embodiments described in FIGS. 3 and 4 have the advantage, with respect to the embodiment of FIG. 2, of having a common induction manifold. In the case of the embodiments of FIGS. 2 and 3 an arrangement with a single injector positioned in one of the two induction manifolds is also possible.

Figure 5:
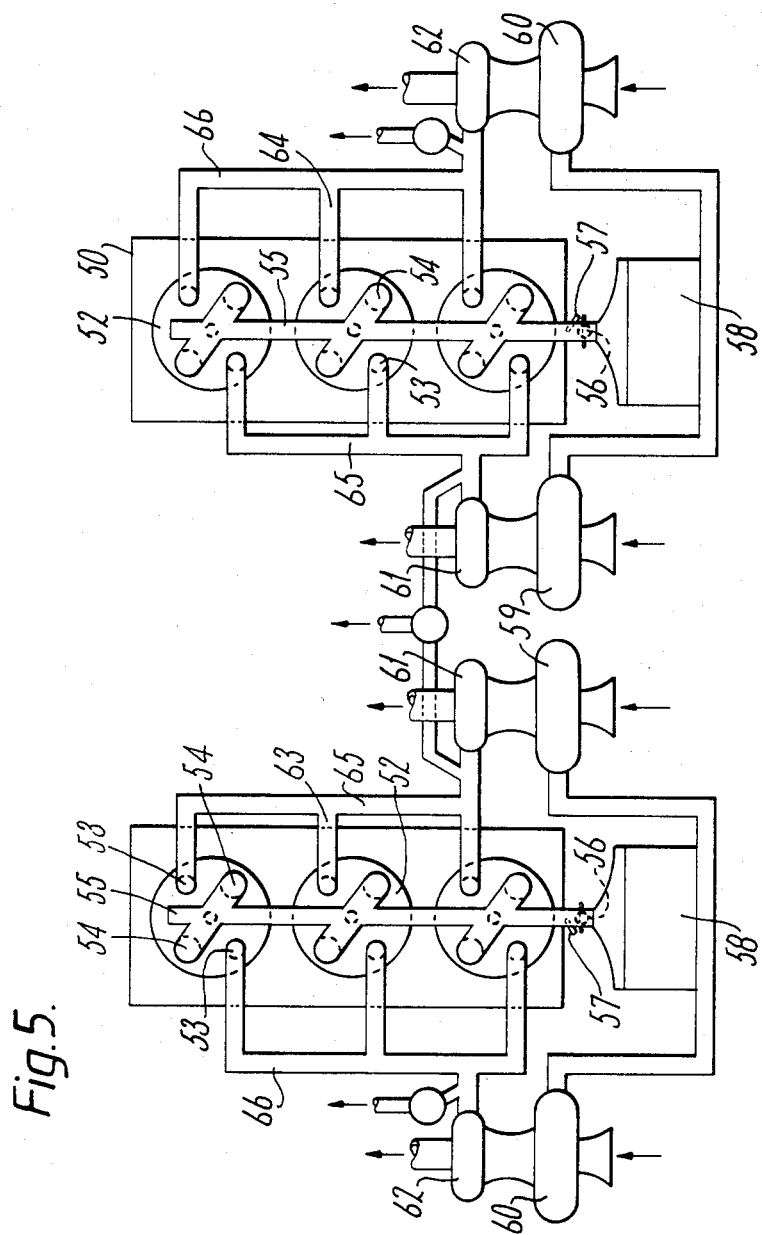
FIG. 5 is a schematic view of a second engine formed according to the invention.

In FIG. 5 a six cylinder engine having the cylinders arranged in a V at 120° with three cylinders per bank is shown. In this drawing the cylinder heads 50 and 51 with the combustion chambers 52 provided with four valves, of which two are exhaust valves 53 and two induction valves 54 can be seen, these being positioned according to previously described arrangements.

In the embodiment illustrated here there is a single induction manifold 55 for each bank of cylinders, as in the arrangement of FIG. 4 described above.

At the entrance to the manifold, contrary to the described arrangements, there is positioned a single butterfly valve 56. Upstream of the butterfly valve the manifold is connected to a heat exchanger 58 which acts to cool the compressed air coming from the two compressors 59 and 60 disposed, for each bank of cylinders, one at the centre of the V and the other outside it.

The four compressors are driven as in the arrangement of FIG. 1 by two turbines 61 and 62 for each bank, driven by exhaust gas conveyed by means of ducts 63 and 64 and manifolds 65 and 66.

The two exhaust manifolds 65 within the V are provided with a common over-pressure valve, whilst two other valves 68 and 69 of the same type serve the manifolds 66 outside the V.

In an embodiment of the type illustrated in FIG. 5 it is also possible to replace two turbo-compressor units within the V with a single turbo-compressor unit of equivalent capacity. There is thus a total of three turbo-compressor units of which the two turbo-compressors on the sides of the engine will be individually supplied by manifolds in each of which converge three exhaust ducts, whilst in the central turbo-compressor unit on the other hand, there will converge gases coming from the remaining six exhaust ducts conveyed by the manifolds.

I claim:
1. An internal combustion engine comprising:
   (a) at least two in-line cylinders forming combustion chambers,
   (b) at least two turbo-compressor units for supercharging said cylinders and with said units being placed at the sides of the engine,
   (c) a cylinder head having four valves per cylinder with each set of said valves being arranged progressively around the circumference of the respective combustion chamber with alternating induction and exhaust valves,
   (d) each said turbo-compressor unit being connected to induction and exhaust manifolds which are in turn respectively associated with induction and exhaust valves which are disposed on one side of a longitudinal axis passing through said cylinder head of said engine.

2. An internal combustion engine according to claim 1, characterised by the fact that the connection of the exhaust and induction valves with the turbo-compressor units include two exhaust manifolds and two induction manifolds disposed on each of the two sides of the engine.

3. An internal combustion engine according to claim 1, characterised by the fact that the connection of the exhaust valves and induction valves with the turbo-compressor units include two exhaust manifolds disposed on the sides of the engine and two induction manifolds disposed on the cylinder head of the engine.

4. An internal combustion engine according to claim 1, characterised by the fact that the connection of the exhaust valves and induction valves to the turbo-compressor units include two exhaust manifolds disposed on the sides of the engine and an induction manifold disposed on the cylinder head of the engine.

5. An internal combustion engine according to claim 4, characterised by the fact that to the induction manifold there are connected two induction ducts for each of two valves for each combustion chamber.

6. An internal combustion engine according to claim 4, characterised by the fact that to the induction manifold there is connected a common induction duct which splits into two ducts to connect to each of the two valves for each combustion chamber.

7. An internal combustion engine provided with two banks of cylinders with at least two cylinders in line in each bank, characterised by the fact that it is provided with four turbo-compressor units disposed on the two sides of each of the two banks of the engine.

8. An internal combustion engine according to claim 7, characterised by the fact that the two turbo-compressor units between the banks of the cylinders are replaced by a common turbo-compressor unit having an equivalent capacity.

* * * * *